US008390573B2

(12) United States Patent
Trout

(10) Patent No.: US 8,390,573 B2
(45) Date of Patent: Mar. 5, 2013

(54) DATA PROCESSING DEVICE

(76) Inventor: Chris Trout, Johnston, IA (US)

( * ) Notice: Subject to any disclaimer, the term of this patent is extended or adjusted under 35 U.S.C. 154(b) by 422 days.

(21) Appl. No.: 12/799,458

(22) Filed: Apr. 26, 2010

(65) Prior Publication Data

US 2011/0260982 A1 Oct. 27, 2011

(51) Int. Cl.
*G06F 3/02* (2006.01)
(52) U.S. Cl. ........................ 345/169; 345/173
(58) Field of Classification Search .......... 345/173–184, 345/169
See application file for complete search history.

(56) References Cited

U.S. PATENT DOCUMENTS

| | | | | |
|---|---|---|---|---|
| 5,515,305 A * | 5/1996 | Register et al. | ............... | 708/145 |
| 5,543,588 A * | 8/1996 | Bisset et al. | ............... | 178/18.06 |
| 5,729,219 A * | 3/1998 | Armstrong et al. | ............. | 341/20 |
| 6,107,988 A * | 8/2000 | Phillipps | ........................ | 345/156 |
| 6,501,464 B1 * | 12/2002 | Cobbley et al. | ............... | 345/173 |
| 6,747,635 B2 * | 6/2004 | Ossia | ............................ | 345/169 |
| 6,909,424 B2 * | 6/2005 | Liebenow et al. | ............ | 345/169 |
| 7,075,513 B2 * | 7/2006 | Silfverberg et al. | .......... | 345/157 |
| 7,088,342 B2 * | 8/2006 | Rekimoto et al. | ............ | 345/169 |
| 7,123,243 B2 * | 10/2006 | Kawasaki et al. | ............. | 345/173 |
| 7,218,313 B2 * | 5/2007 | Marcus et al. | ................ | 345/169 |
| 7,283,837 B2 * | 10/2007 | Nagao | ........................ | 455/550.1 |
| 7,403,192 B2 * | 7/2008 | Lai | ................ | 345/173 |
| 7,705,799 B2 * | 4/2010 | Niwa | ............................. | 345/1.1 |
| 7,800,592 B2 * | 9/2010 | Kerr et al. | ...................... | 345/173 |
| 8,245,158 B1 * | 8/2012 | Schrick | ........................ | 715/864 |
| 2004/0164968 A1 * | 8/2004 | Miyamoto | .................... | 345/173 |
| 2005/0275633 A1 * | 12/2005 | Varanda | ........................ | 345/173 |
| 2006/0097990 A1 * | 5/2006 | Izumi | ............................ | 345/173 |
| 2006/0214916 A1 | 9/2006 | Mulford | | |
| 2007/0257890 A1 | 11/2007 | Hotelling et al. | | |
| 2010/0323762 A1 * | 12/2010 | Sindhu | ........................ | 455/566 |

* cited by examiner

*Primary Examiner* — Christopher E Leiby
(74) *Attorney, Agent, or Firm* — Brett J. Trout

(57) ABSTRACT

A data input device is disclosed herein. The input device includes a body having a rearward face and a forward face. Provided on the forward face is a display, and provided on the rearward face is a keyboard. The input device is configured to display a ghost image of the keyboard on the display to allow the user to locate the keys on the rearward face of the input device without having to turn the device around. The input device allows the user to operate a keyboard on the rear of the input device to increase the usable surface area of the display without having to include the extra bulk and size associated with a separate keyboard located adjacent the display.

20 Claims, 7 Drawing Sheets

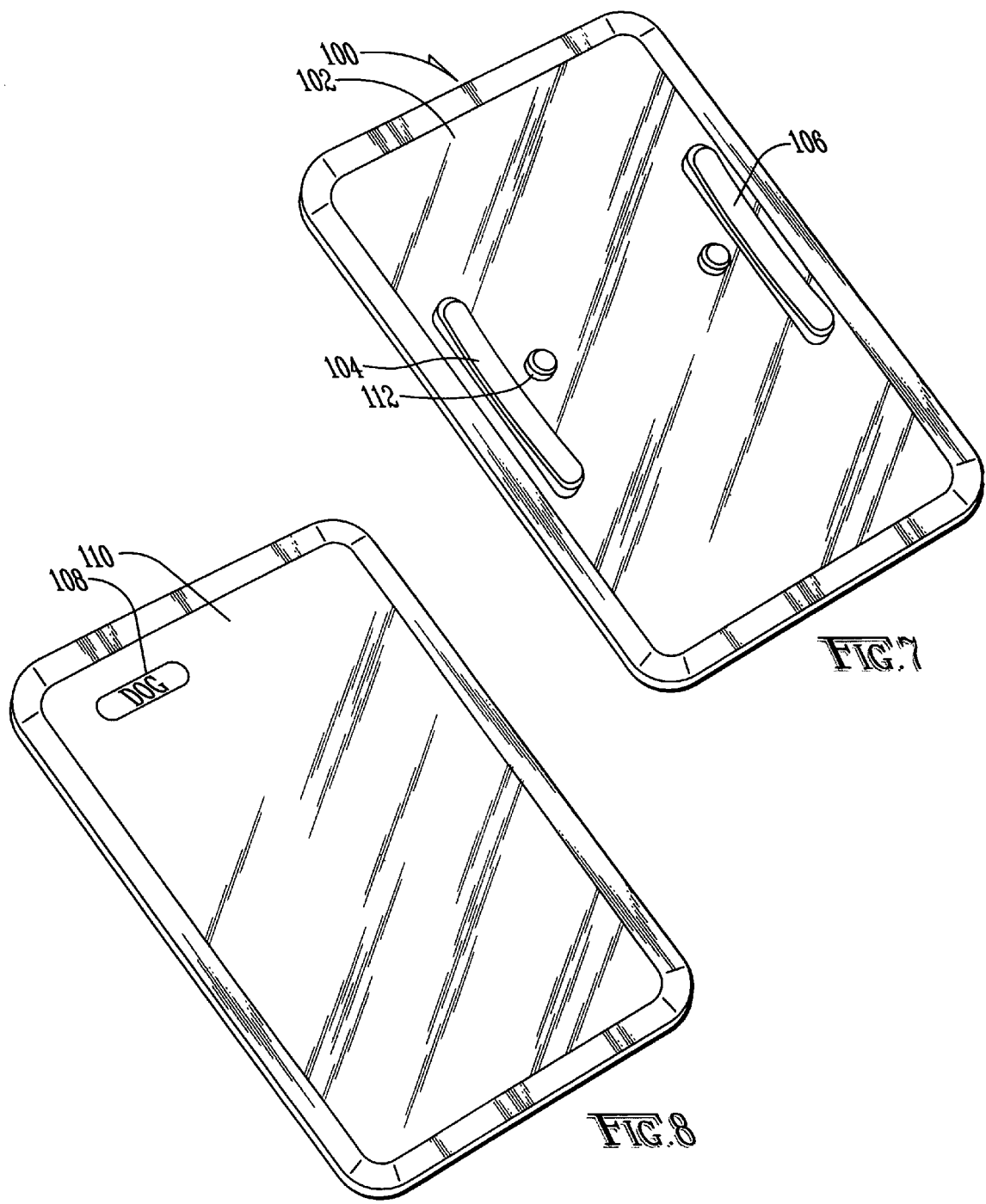

DATA PROCESSING DEVICE

TECHNICAL FIELD

The present invention relates to a computing device and keyboard assembly and, more particularly, to a computing device with a display on the front of the device and a keyboard on the rear of the device.

DESCRIPTION OF THE BACKGROUND ART

There are many styles of input devices for inputting information into a computer system. Such devices include keyboards, mice, touch screens, as well as other similar devices. Such devices are typically located between a display screen and the user to allow the user to see both the display and the input devices as they are being used.

While space may not be a large concern for desktop or even laptop computer systems, for handheld computing devices space is of particular concern. Some handheld devices include a physical keyboard. The location of the physical keyboard on the face of the handheld device reduces the amount of space available for display. While it is known to include a virtual keypad as a portion of a touch screen handheld device, such a keyboard still takes up a large portion of the display area while it is being used.

It is also known to provide a fold-out or slidable physical keyboard so as not to encroach upon the display area. However, the incorporation of such a physical keyboard not only increases the size and weight of the overall device, but requires additional space to use the handheld device when the keyboard is folded or slid into its operating position.

Therefore, what is needed in the art is a device that maintains a desired display size, does not require a separate keyboard which must be folded or slid into an operational position, and which allows access to a keyboard without encroaching upon the display area of a handheld device.

SUMMARY OF THE DISCLOSED SUBJECT MATTER

A data input device is disclosed herein. One aspect of the data input device relates to the incorporation of a keyboard on the rearward face of the input device and a display on the forward face of the input device.

Another aspect of the data input device relates to providing a plurality of map points on the display of the data input device, corresponding to the keys of the keyboard provided on the rearward face of the input device.

Another aspect of the data input device relates to a virtual keyboard corresponding to the keyboard provided on the rearward face of the data input device being ghosted on the display of the forward face of the data input device.

Another aspect of the data input device relates to a keyboard assembly for a computing device that does not encroach upon the display area of the computing device.

Another aspect of the data input device relates to a keyboard assembly of a computing device that is of a lightweight, compact construction.

Another aspect of the data input device relates to a keyboard assembly for a computing device that is of a compact and lightweight construction.

Another aspect of the data input device relates to a keyboard assembly for a computing device that is of a low cost, low maintenance construction.

These and other aspects will be more readily understood by reference to the following description and figures.

BRIEF DESCRIPTION OF THE DRAWINGS

The present invention will now be described, by way of example, with reference to the accompanying drawings in which:

FIG. 7 illustrates a top perspective view of an alternative embodiment of the data input device; and FIG. 8 illustrates a bottom perspective view of the data input device of FIG. 7.

DETAILED DESCRIPTION OF THE DRAWINGS

Figure 1:
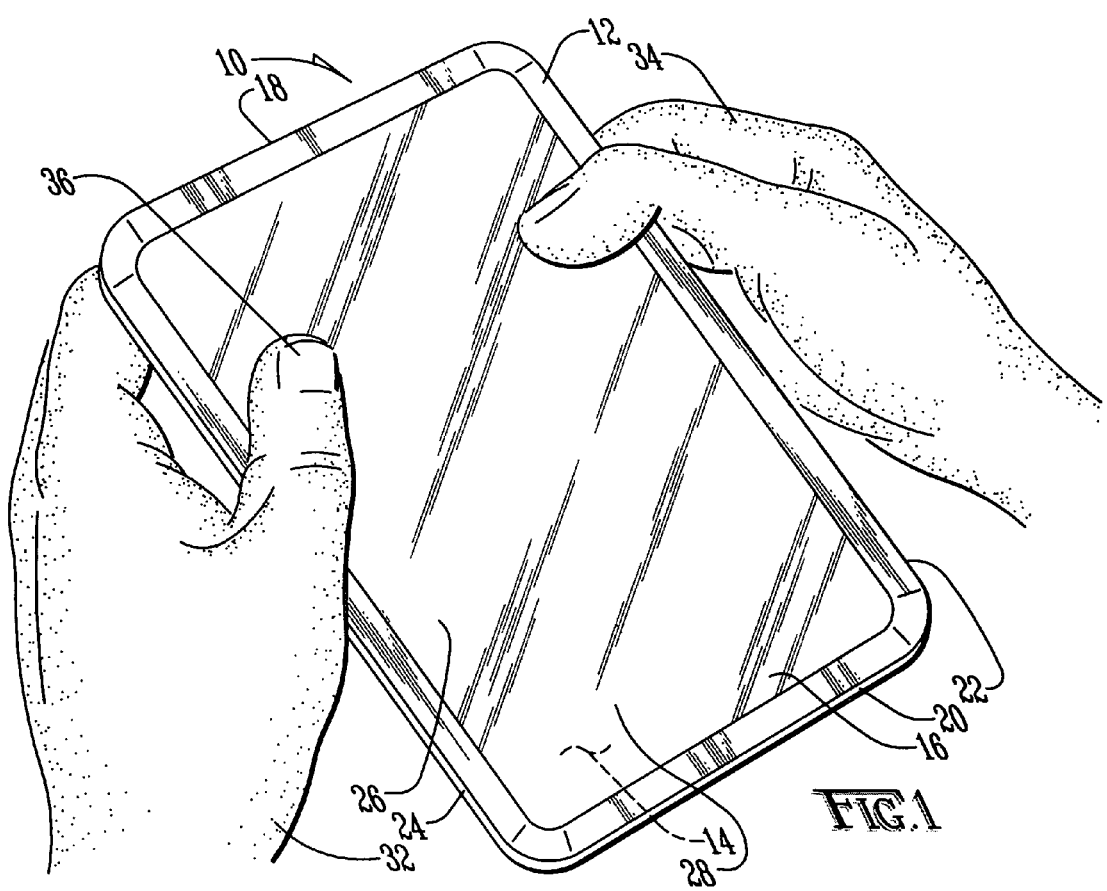
FIG. 1 illustrates a top perspective view of a data input device incorporating a rear keyboard and multi-touch touch screen according to certain teachings of the present disclosure.

A data input device is shown generally as (10) in FIG. 1. The embodiments of the invention described below are illustrated only and are not to be interpreted as limiting the scope of the present invention.

Figure 2:
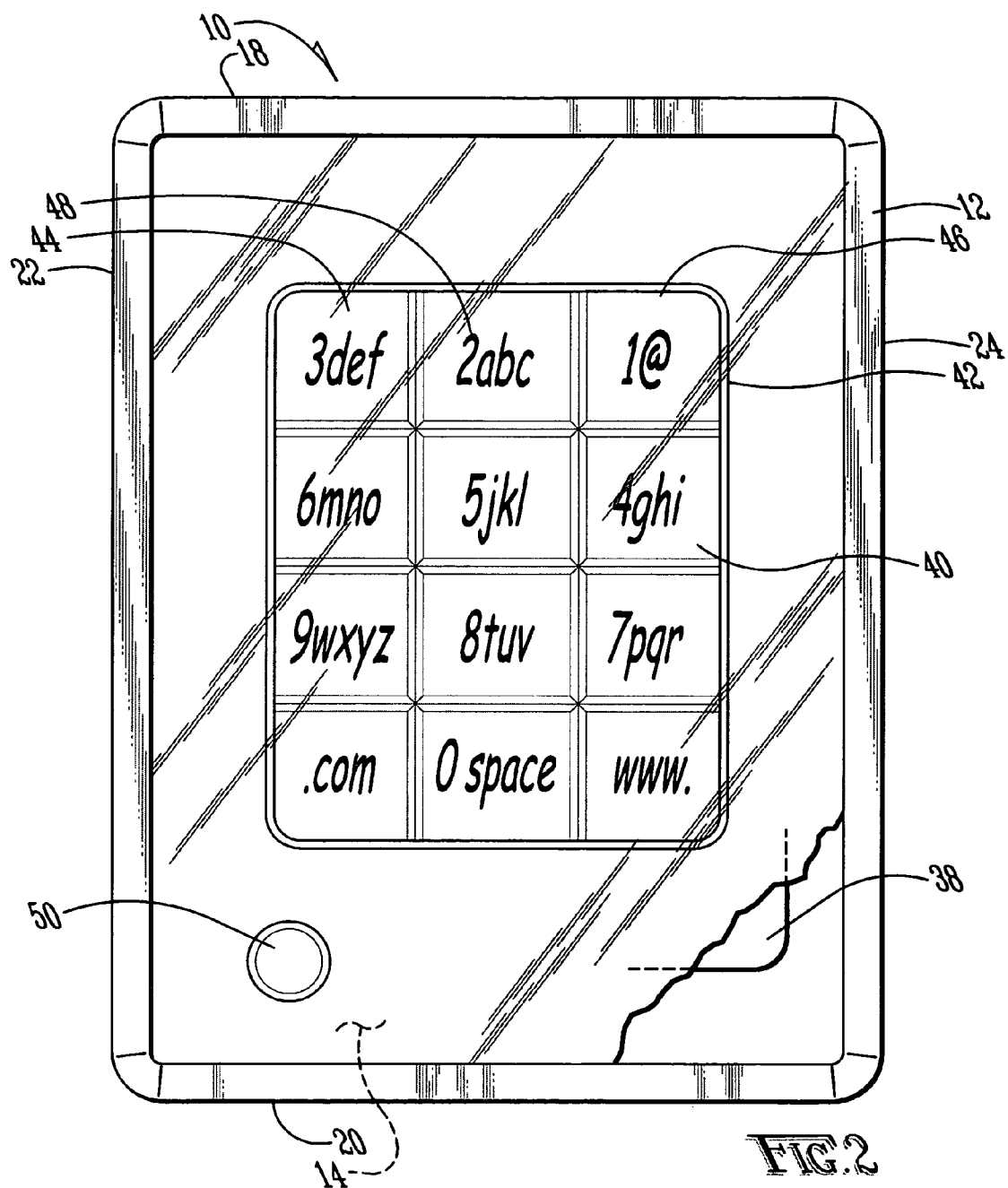
FIG. 2 illustrates a rear elevation in partial cutaway of the data input device of FIG. 1.

The data input device is provided with a body (12) having a rearward face (14), a forward face (16), a top (18), a bottom (20), a first edge (22) and second edge (24). (FIGS. 1-2).

As shown in FIG. 1, provided on the forward face (16) of the data entry device (10) is a display (26). Provided in front of the display (26) is a transparent touch screen (28). The display (26) and transparent touch screen (28) may be of any type known in the art. The dimensions of the data input device (10) may be any suitable dimensions. In the preferred embodiment, the body (12) is between 0.2 and 3.0 centimeters thick, more preferably between 0.3 and 2.0 centimeters thick and, most preferably, between 0.5 and 1.5 centimeters thick. In the preferred embodiment, the body is approximately 1.0 centimeter thick.

The height of the body (12) from the bottom (20) to the top (18) is preferably 5.0 to 50.0 centimeters, more preferably 7.0 to 25.0 centimeters and, most preferably, between 9.0 and 12.0 centimeters. In the preferred embodiment the body (12) is 10.0 centimeters high.

The width of the body (12) from the first edge (22) to the second edge (24) is preferably between 1.0 and 40.0 centimeters, more preferably between 3.0 and 30.0 centimeters and, most preferably, between 4.0 and 8.0 centimeters. In the preferred embodiment, the width of the body (12) is about 6.0 centimeters.

Figure 3:
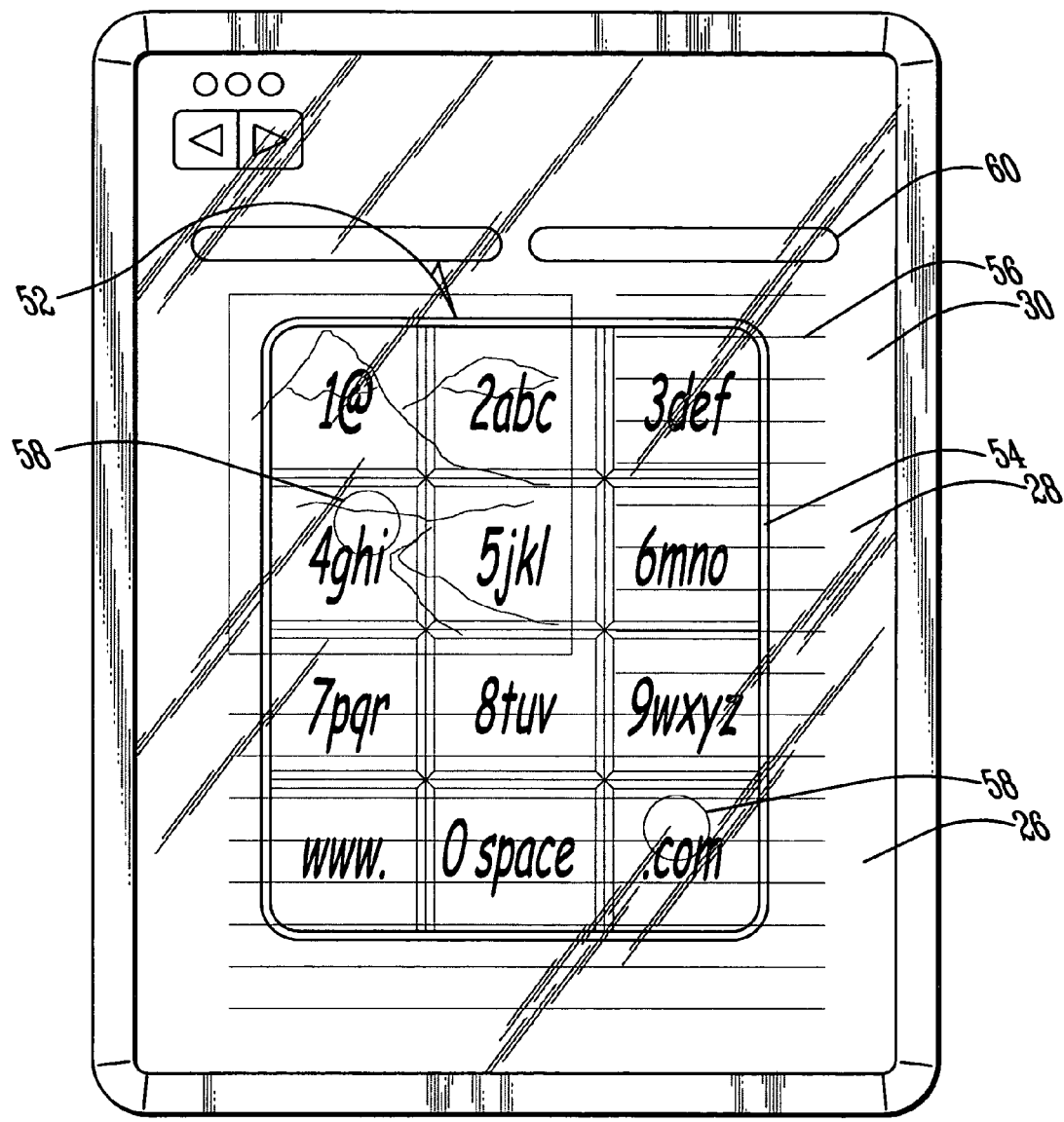
FIG. 3 illustrates a front elevation of the data input device of FIG. 1.
Figure 4:
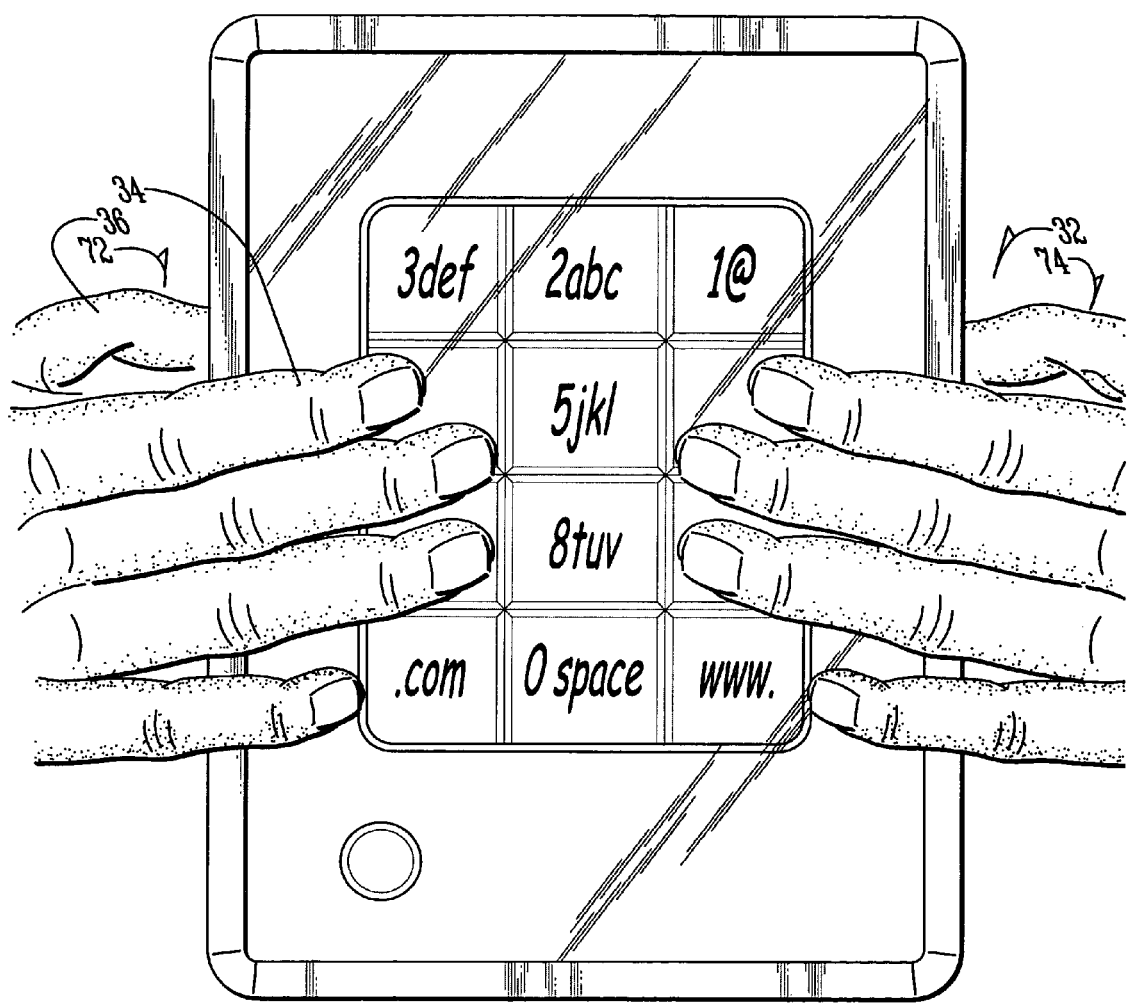
FIG. 4 illustrates a rear elevation of the data input device of FIG. 1 being used by a user.

The display (26) may be of any suitable type known in the art to display a graphical user interface (30). (FIG. 3). As known in the art, the transparent touch screen (28) detects the touch of a user (32) placing a finger (34) or thumb (36) on the touch screen (28). (FIG. 4). As known in the art, the data input device (10) is provided with a central processing unit (38) which interprets a touch event, the user (32) placing a finger (34) or thumb (36) on the touch screen (28), and thereafter performs a function associated with the location of the user's finger (34) or thumb (36) on the touch screen (28). (FIGS. 1-2). Preferably, the touch screen (28) is designed to recognize multiple touch events, occurring simultaneously, at different locations on the touch screen (28). One such device is described in United States Letters Patent Application No. US 2007/0257890 to Hotelling, et al, which is incorporated herein by reference.

As shown in FIG. 2, provided on the rearward face (14) of the body (12) is a keyboard (40) having a plurality of keys (42). As shown in FIG. 2, a first column (44) of keys (42) is positioned closer to the first edge (22) of the body (12) and a second column (46) of keys (42) is positioned closer to the second edge (24) of the body (12). The keys (42) are preferably physical buttons which must be depressed to actuate. Alternatively, the keyboard (40) may be a touch screen or other touch sensitive keyboard, such as those known in the art.

The keyboard (40) is preferably provided with a plurality of alphanumeric symbols (48). As shown in FIG. 2 the alphanumeric symbols (48) may be provided in the configuration of a T9 keypad. When combined with the T9 compatible software associated with the central processing unit (38), the central processing unit (38) is able to anticipate words being conveyed by the user (32) pressing various keys (42) without the user (32) having to use a full sized keyboard or finish typing the entire word.

As shown in FIG. 3, when it is desired to input data into the data input device (10), an on button (50) located on the rearward face (14) of the body (12) is pressed by a finger (34) of the user (32) to actuate the keyboard (40) and cause the central processing unit (38) to display a plurality of map points (52) on the display (26). The map points (52) may be lighted areas, unlighted areas, or any other type of display corresponding to the location of the keys (42) on the rearward face (14) of the data input device (10). (FIGS. 1-3.) Preferably, the map points (52) are displayed in the form of a ghost image (54) which is a lighter image than the background image (56) displayed on the display (26), such as a website, document or other displayed item. While the ghost image (54) is preferably light enough to allow the user (32) to still see the background image (56) through the ghost image (54), if desired, the data input device may be adjustable to allow adjustment of the intensity of the ghost image (54) from opaque to non-existent. When the user (32) is first beginning to become familiar with the use of the data input device (10), the user (32) may set the ghost image (54) to be opaque to allow for easier identification of the location of the keys (42) associated with the keyboard (40). As the user (32) becomes more adept at using the keys (42), the user (32) may adjust the intensity of the ghost image (54) to a point where the user (32) has the location of the keys (42) memorized so the ghost image (54) may be lightened, or even eliminated.

As shown in FIG. 3-4, when the user (32) locates fingers (34) on the keys (42), ghost images (58) of the fingers (34) appear on the display (26) to allow the user (32) to locate the user's fingers (34) on the rearward face (14) of the data input device (10) relative to the keys (42). The sensitivity of the keys (42) may be adjusted so that a slight pressure on the keys (42) generates a ghost image (58) without sending a signal to the central processing unit (38) to process the action associated with a particular key (42) until the key (42) is fully depressed by the user (32). This configuration would allow the user (32) to contact the keys (42) lightly to locate the ghost images (58) of the figures on the display (26) before fully depressing the keys (42) and sending an action signal to the central processing unit (38).

Alternatively, if a touch screen is used on the rearward face (14), any desired input configuration known in the art may be used. In one example, the input device (10) may be configured so that the positioning of a user's fingers (34) on the rearward face (14) causes a ghost image (58) to appear on the display (26), but an action signal associated with a particular key (42) is not sent to the central processing unit (38) until the user removes the finger (34) from a key (42) on the rearward face (14) of the data input device (10). In another alternative embodiment, the data input device (10) may be configured to require multiple taps on a particular key (42) before sending an action signal to the central processing unit (38).

Accordingly, when it is desired to operate the data input device (10) of the present invention, the user (32) holds the data input device (10) as shown in FIG. 2. The user (32) may indicate an input field (60) with a thumb (36) before depressing the button (50) on the rearward face (14) of the data input device (10). (FIGS. 1-4). Thereafter, the user (32) positions the user's fingers (34) on the keyboard (40) and locates the ghost images (54) of the user's fingers (34) relative to the keys (42) located on the rearward face (14) of the data input device (10). The user (32) then begins typing a word, phrase, code or other input into the input field (60) using the keys (42) of the keyboard (40). When the user (32) is finished, the user (32) may actuate the button (50), indicate another input field (62) with the user's thumb (36), or use the use the user's fingers (34) to directly manipulate the background image (56) of the display (26) using the multi-touch transparent touch screen (28).

Figure 5:
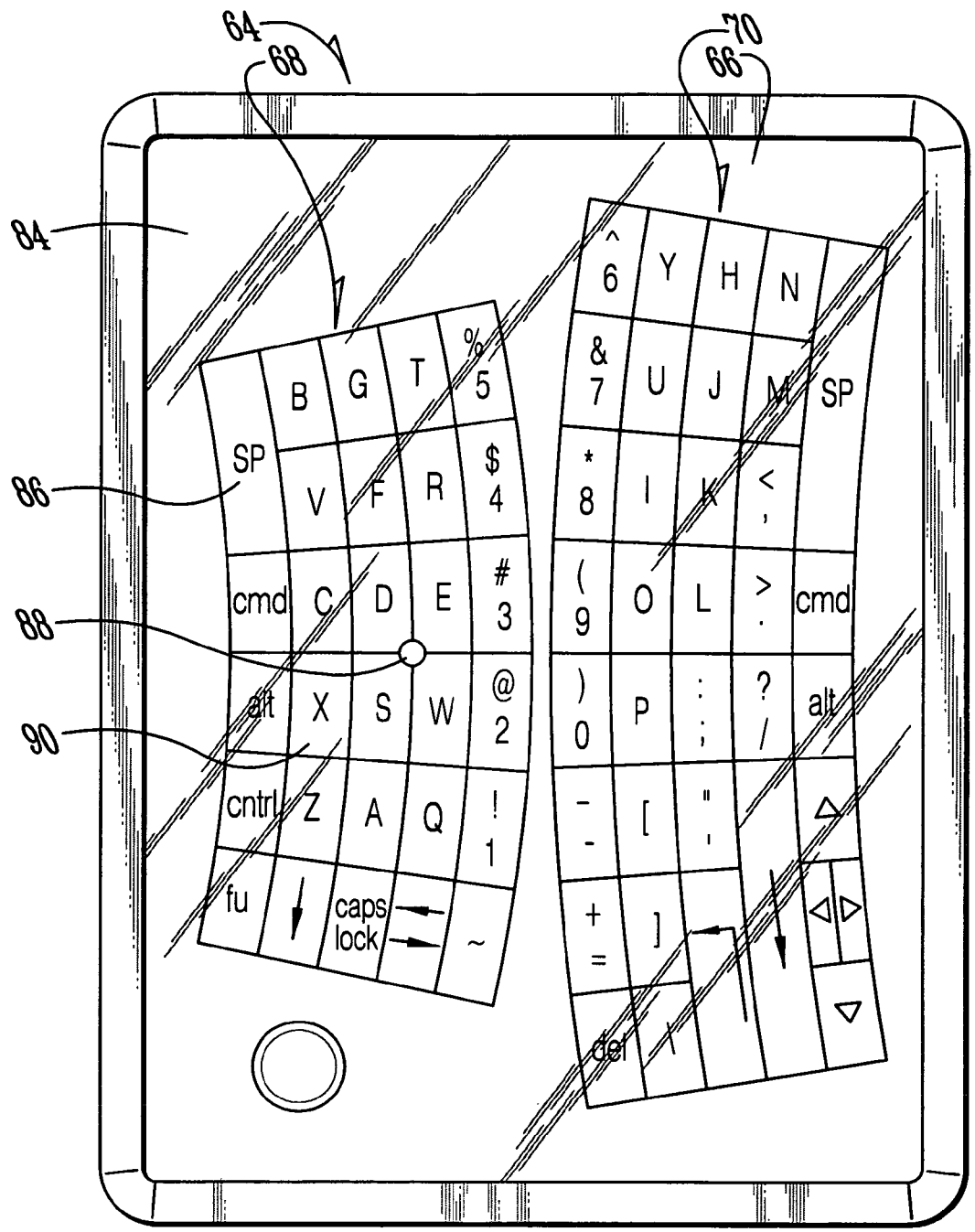
FIG. 5 illustrates a rear elevation of an alternative embodiment of a data input device according to certain teachings of the present disclosure.
Figure 6:
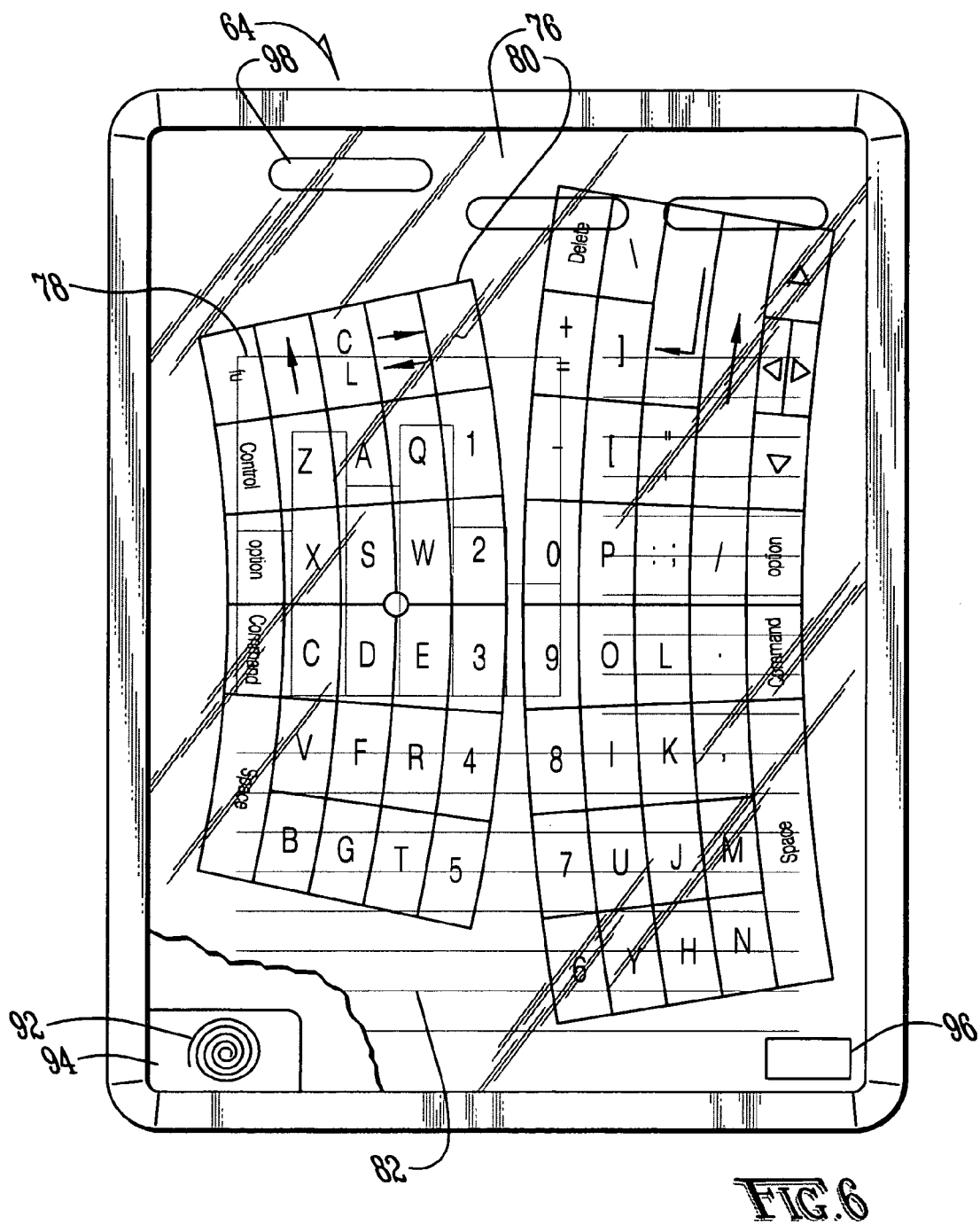
FIG. 6 illustrates a front elevation in partial cutaway of the data input device of FIG. 5.

An alternative embodiment of the present invention is shown generally as (64) in FIG. 5. The rearward face (66) of the device (64) is provided with two curved keyboards (68) and (70). As shown, the curved keyboards (68) and (70) are arranged to allow easier access by a user's fingers (34). The keyboards (68) and (70) are preferably provided with alphanumeric symbols in the mirror image of a standard "qwerty" configuration, so that the ghost image of the keyboards (68) and (70) appear as standard keyboards to the user. Half of the qwerty keyboard is, therefore, accessible by each hand (72) and (74) of a user (32). (FIGS. 4-5). As shown in FIG. 7, the display (76) of the device (64) includes a background image (78) such as that described above and a plurality of map points (80) in the form of a ghost image (82) of the keyboards (68) and (70).

The rearward face (66) of the device (64) is an opaque touch screen (84) embossed with symbols (86). As shown in FIG. 5, it is desirable to position locator pins (88) on various keys (90) to allow a user to locate fingers (34) on the keyboards (68) and (70) without depressing any keys (90). Alternatively, the touch screen (84) may be a transparent multi-touch touch screen, allowing the user (32) to adjust the type, configuration, function and location of the keyboards (68) and (70) on the rearward face (66). With the transparent touch screen, the user (32) may switch back and forth between a T9 keyboard configuration and a qwerty configuration.

Also as shown in FIG. 7, the device (64) is provided with a wireless signal transmitter (92), such as those known in the art, which may be an 802.11g, 3G, 4G or other wireless signal transmitter, a wireless signal receiver (94) for receiving wireless transmissions, and an audio input receiver (96), such as a microphone (94), and an audio output (98), such as a microphone jack or a speaker. The audio output (98) may be configured to assist in location of the user's fingers (34) on the keyboards (68) and (70), to provide an audio cue regarding which key is being pressed, which may operated in addition to or instead of the ghost image (82) on the display (76).

Although the invention has been described with respect to a preferred embodiment thereof, it is to be understood that it is not to be so limited since changes and modifications can be made therein which are within the full, intended scope of this invention as defined by the appended claims. For example, any number of keys may be provided on the rear of the device (10).

An alternative embodiment of the present invention is shown generally as (100) in FIG. 7. On the rearward face (102) of the device (100) is a first rocker switch (104) and a second rocker switch (106). A user may tilt the rocker switch (104) in a first direction to begin scrolling through alphanumeric characters (108) displayed on the display (110). (FIGS. 7-8). The user may release the rocker switch (104) to stop the scrolling and tilt the rocker switch (104) in the opposite direction to scroll through the alphanumeric characters (108) in the opposite direction. Both sides of the rocker switch (104) may be depressed to select an alphanumeric character (108), or a separate key (112) may be provided for this purpose.

What is claimed is:

1. A data input device comprising:
   (a) a body having a rearward face and a forward face;
   (b) a display located on the forward face of the body;
   (c) a first key located on the rearward face of the body;
   (d) a first map point displayed on the display, the first map point configured to indicate the location of the first key;
   (e) a second key located on the rearward face of the body;
   (f) a second map point displayed on the display, the second map point configured to indicate the location of the second key;
   (g) a an input field displayed on the display;
   (h) wherein the first map point is a ghost image;
   (i) wherein the first key is depressible to a first position, in which the first key is not fully depressed, and a second position, which is more depressed than the first position;
   (j) a non-transitory computer readable program code, encoded in a computer-readable medium executed by the data input device, the program code comprising:
      (i) program code for identifying the depression of the first key to the first position;
      (ii) program code for displaying the map point on the display in response to the depression of the first key to the first position;
      (iii) program code for identifying the depression of the first key to the second position;
      (iv) program code for generating a first predetermined alphanumeric character on the display in response to selection of the input field and the depression of the first key to the second position;
      (v) program code for identifying the depression of the second key;
      (vi) program code for generating a second predetermined alphanumeric character on the display in response to the depression of the second key; and
   (k) wherein the ghost image is adjustable in intensity.

2. The data input device of claim 1, a keyboard comprising:
   (a) the first key;
   (b) the second key; and
   (c) at least six additional keys.

3. The data input device of claim 2, at least six additional map points displayed on the display, the at least six additional map points configured to indicate the location of the at least six additional keys.

4. The data input device of claim 3, wherein the body has a first edge and a second edge, wherein the first edge is opposite the second edge and wherein the first button is located less than ten centimeters from the first edge, and wherein the second button is located less than ten centimeters from the second edge.

5. The data input device of claim 4, wherein at least three of the at least six additional keys are in a first concave configuration facing the first edge and wherein at least three of the at least six additional keys are in a second concave configuration facing the second edge.

6. The data input device of claim 5, wherein the display is a touch screen.

7. The data input device of claim 6, wherein the first map point is a ghost image.

8. The data input device of claim 1, a wireless signal transmitter.

9. The data input device of claim 1, an audio input receiver.

10. The data input device of claim 1, wherein the first map point is a first letter of an alphabet and the second map point is a second letter of an alphabet.

11. The data input device of claim 1, wherein the first map point is a first word and the second map point is a second word.

12. A data input device comprising:
   (a) a body comprising:
      (i) a rearward face
      (ii) a forward face;
      (iii) a left edge; and
      (iv) a right edge;
   (b) a display located on the forward face of the body;
   (c) a first key located on the rearward face of the body;
   (d) wherein the first key is depressible to a first position, in which the first key is not fully depressed, and a second position, which is more depressed than the first position;
   (e) a map point displayed on the display, the map point configured to indicate the location of the first key;
   (f) wherein the first map point is a ghost image;
   (g) a second key located on the rearward face of the body; and
   (h) wherein the ghost image is adjustable in intensity.

13. The data input device of claim 12, wherein the first key is separated from the second key by at least two centimeters.

14. The data input device of claim 12, further comprising:
   (a) a first mapped point displayed on the display, the first mapped point configured to indicate the location of the first key; and
   (b) a second mapped point displayed on the display, the second mapped point configured to indicate the location of the second key.

15. The data input device of claim 14, wherein the first mapped point is a ghost image.

16. The data input device of claim 15, further comprising information displayed on the display across the ghost image, wherein the information is unrelated to the first key.

17. The data input device of claim 15, wherein the ghost image corresponds to a first alphanumeric character.

18. A method of operating a data input device, the data input device comprising providing a body having a rearward face and a forward face, a display on the forward face of the body, and a keyboard on the rearward face of the body, the method comprising:
   (a) suspending the body above the ground with a first hand along a first edge of the body;
   (b) wherein a portion of the first hand is on the rearward face and a portion of the first hand is on the forward face;
   (c) placing a second hand along a second edge of the body, wherein a portion of the second hand is on the rearward face and a portion of the second hand is on the forward face;

(d) providing a first key is depressible to a first position, in which the first key is not fully depressed, and to a second position, which is more depressed than the first position;

(e) displaying a map point on the display, wherein the map point is a ghost image configured to indicate the location of the first key associated with the keyboard;

(f) adjusting the intensity of the ghost image;

(g) typing the first key while maintaining a portion of the first hand on the rearward face and a portion of the first hand on the forward face;

(h) displaying a first character associated with the first key on the display;

(i) typing a second key of the keyboard while maintaining a portion of the second hand on the rearward face and a portion of the second hand on the forward face; and (j) displaying a second character associated with the second key on the display.

19. The method of operating a data input device of claim 18, further comprising displaying a first map point on the display associated with the location of the first key.

20. The method of operating a data input device of claim 19, wherein the map point is a ghost image.

* * * * *